United States Patent [19]
Todd

[11] Patent Number: 5,630,352
[45] Date of Patent: May 20, 1997

[54] VARIABLE DISPLACEMENT HYDRUALIC PISTON MACHINE SADDLE BEARING

[75] Inventor: Steven M. Todd, Omaha, Nebr.

[73] Assignee: Vickers, Incorporated, Maumee, Ohio

[21] Appl. No.: 613,104

[22] Filed: Mar. 8, 1996

[51] Int. Cl.$^6$ .................. F01B 3/00; F16C 32/02
[52] U.S. Cl. .................. 92/12.2; 92/71; 384/2; 74/60
[58] Field of Search .......... 92/12.2, 71; 74/60; 417/269; 384/2

[56] References Cited

U.S. PATENT DOCUMENTS

| | | | |
|---|---|---|---|
| 4,029,367 | 6/1977 | Schwede et al. | 384/2 |
| 4,332,426 | 6/1982 | Speicher | 384/2 |
| 4,627,330 | 12/1986 | Beck, Jr. | 384/2 X |
| 4,856,917 | 8/1989 | Schroder et al. | 384/2 X |
| 4,858,480 | 8/1989 | Rohde et al. | 92/12.2 X |
| 4,862,789 | 9/1989 | Burgess et al. | 92/12.2 |
| 5,515,768 | 5/1996 | Fritz et al. | 92/71 |

*Primary Examiner*—Hoang Nguyen
*Attorney, Agent, or Firm*—Barnes, Kisselle, Raisch Choate, Whittemore & Hulbert, P.C.

[57] ABSTRACT

A variable displacement hydraulic piston machine that includes a shaft mounted for rotation within a housing, a plurality of pistons in a cylinder block coupled to the shaft, a yoke engaged by the pistons for controlling displacement of the pistons in the cylinder block, and saddle bearings pivotally mounting the yoke to a base within the housing. Each saddle bearing includes arcuate inner and outer bearing races fixed to the yoke and the housing base respectively, a plurality of rolling elements captured by a cage between the races, and a timing lever positioning and retaining the races and the cage with respect to each other. The timing lever has a central portion pivotally mounted to the bearing between the bearing races, and opposed end portions pivotally received in the housing base and yoke. The lever automatically positions the bearing elements with respect to each other and with respect to the housing base and yoke, and limits movement of the various elements with respect to each other during the assembly process and during operation.

14 Claims, 5 Drawing Sheets

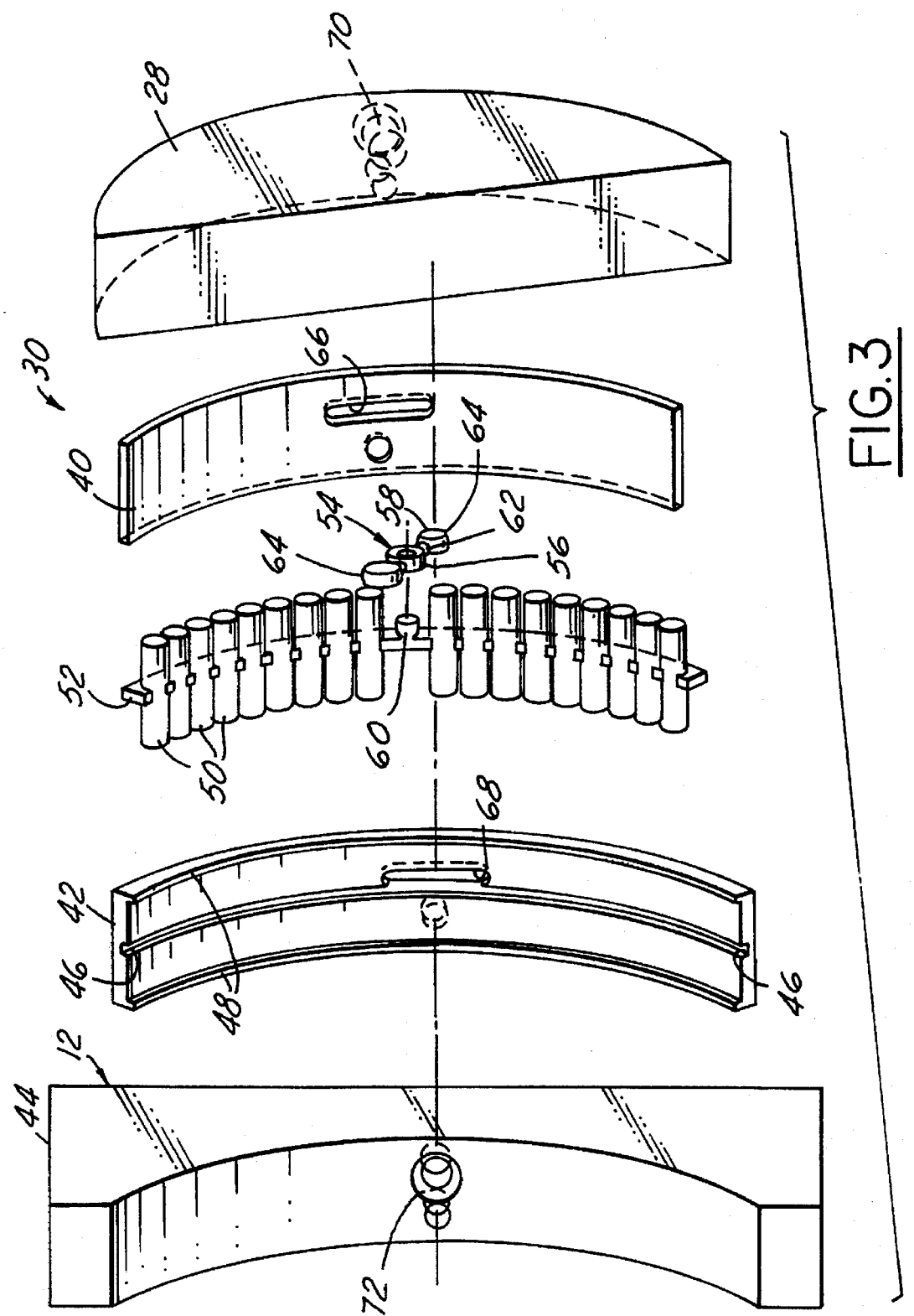

VARIABLE DISPLACEMENT HYDRUALIC PISTON MACHINE SADDLE BEARING

The present invention is directed to variable displacement hydraulic piston machines (pumps and motors), and more particularly to an improved saddle bearing for mounting the piston displacement-control yoke to the machine housing.

BACKGROUND AND SUMMARY OF THE INVENTION

Variable displacement hydraulic piston pumps and motors conventionally include a plurality of pistons slidable in a cylinder block coupled to a shaft that is rotatable within the machine housing. The pistons engage a yoke that is pivotally mounted to the housing by laterally spaced saddle bearings and engaged by a hydraulic piston or other suitable means for controlling displacement of the pistons within the cylinder block as the cylinder block rotates about the axis of the shaft. The cylinder block cavities in which the pistons are disposed are coupled by a valve plate or other suitable means to fluid inlet and outlet ports in the housing. The present invention deals with construction of the saddle bearings, which are lubricated by hydraulic fluid at case pressure within the machine housing.

The saddle bearings may be of non-rolling element construction as disclosed in U.S. Pat. No. 4,862,789, or of rolling element (roller or needle bearing) construction as in the present application. When a rolling element saddle bearing is employed, the roller retainer or cage is free during assembly to travel outside of the boundary of the inner and outer bearing races. It would be advantageous to provide facility to time the three arcuate bearing components (the cage and the inner and outer races) during assembly to prevent the cage from being positioned incorrectly. It is therefore a general object of the present invention to provide a rolling element saddle bearing of the described character having such facility for positioning and retaining the bearing elements with respect to each other during the assembly process.

A variable displacement hydraulic piston machine in accordance with the present invention includes a shaft mounted for rotation within a housing, a plurality of pistons in a cylinder block coupled to the shaft, a yoke engaged by the pistons for controlling displacement of the pistons in the cylinder block, and a saddle bearing pivotally mounting the yoke to a base within the housing. The saddle bearing includes arcuate inner and outer bearing races fixed to the yoke and the housing base respectively, a plurality of rolling elements captured by a cage or retainer between the races, and a timing lever positioning and retaining the races and the cage with respect to each other. The timing lever has a central portion pivotally mounted to the bearing between the bearing races, and opposed end portions pivotally received in the housing base and yoke. Thus, the lever automatically positions the bearing elements with respect to each other and with respect to the housing base and yoke, and limits movement of the various elements with respect to each other during the assembly process and operation. In the preferred embodiments of the invention, the opposed end portions of the timing lever have pan-spherical bearing heads that are slidably received in associated openings in the yoke and housing base. The central portion of the timing lever is pivotally mounted either to the cage or on one of the rolling elements themselves. The bearing races may have respective arcuate slots through which the opposed ends of the timing lever extend into associated openings in the yoke and housing base.

In accordance with another aspect of the present invention, there is therefore provided a saddle bearing suitable for use in mounting a yoke in a variable displacement hydraulic piston machine, as well as other similar applications. The bearing includes arcuate inner and outer bearing races, a plurality of rolling elements and a cage capturing the elements between the races for rolling engagement with the races. A timing lever has a central portion pivotally mounted between the bearing races, and opposed end portions extending from the central portion for receipt in structure between which the saddle bearing is to be mounted. In this way, the timing lever automatically positions and retains the races and cage with respect to such structure.

BRIEF DESCRIPTION OF THE DRAWINGS

The invention, together with additional objects, features and advantages thereof, will be best understood from the following description, the appended claims and the accompanying drawings in which:

FIG. 3 is an exploded perspective view of the saddle bearing illustrated in FIG. 2;

DETAILED DESCRIPTION OF PREFERRED EMBODIMENTS

Figure 1:
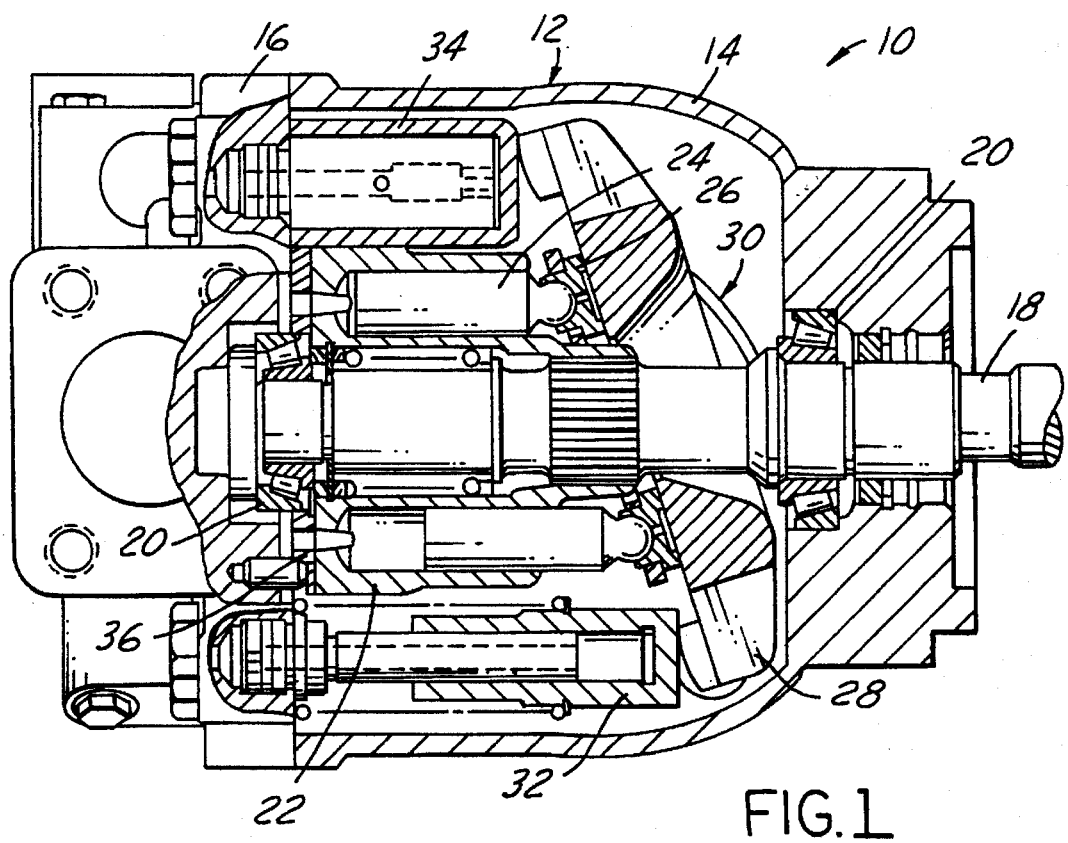
FIG. 1 is a fragmentary sectional view of a variable displacement hydraulic piston machine embodying the present invention.

FIG. 1 illustrates a variable displacement hydraulic in-line piston machine 10 as comprising a housing 12 that includes a case 14 mounted to a valve block 16. A shaft 18 is mounted by bearings 20 for rotation within housing 12. A cylinder block 22 is coupled to shaft-18 for co-rotation therewith, and has a circumferential array of cylinder cavities surrounding shaft 18. A plurality of pistons 24 are axially slidably disposed in associated cavities of cylinder block 22. The axial end of each piston 24 is fastened to a shoe 26 that slidably engages the face of a swash plate or yoke 28. Yoke 28 is mounted to housing 12 by a pair of saddle bearings 30 disposed on opposed sides of shaft 18, and is engaged on opposed sides of shaft 18 by a spring-biased piston 32 and a displacement control valve 34 for controlling pivotal position of yoke 28 with respect to housing 12 and shaft 18. The cylinder cavities of cylinder block 22 are connected through a valve plate 36 and suitable passages in valve block 26 to machine inlet and outlet ports for feeding fluid to and from the cylinder block.

In operation as a pump, rotary motion is applied to shaft 18 from an external source (not shown) for rotating cylinder block 22 within housing 12. Pivotal position of yoke 28 is controlled by spring-biased piston 32 and control valve 34 to vary displacement of pistons 24 within cylinder block 22 from a zero displacement position in which yoke 28 is perpendicular to the axis of shaft 18, to a maximum displacement position as shown in FIG. 1. Displacement of pistons 24 within cylinder block 22 as the cylinder block rotates draws hydraulic fluid from a sump and pumps the fluid under pressure through suitable valving and outlet ports in valve block 16. In operation as a motor, the hydraulic fluid is pumped under pressure to the cavities of cylinder block 22, and positive displacement of pistons 24 within the cylinder block causes rotation of the cylinder block and corresponding rotation of shaft 18 as an output from the motor.

Figure 2:
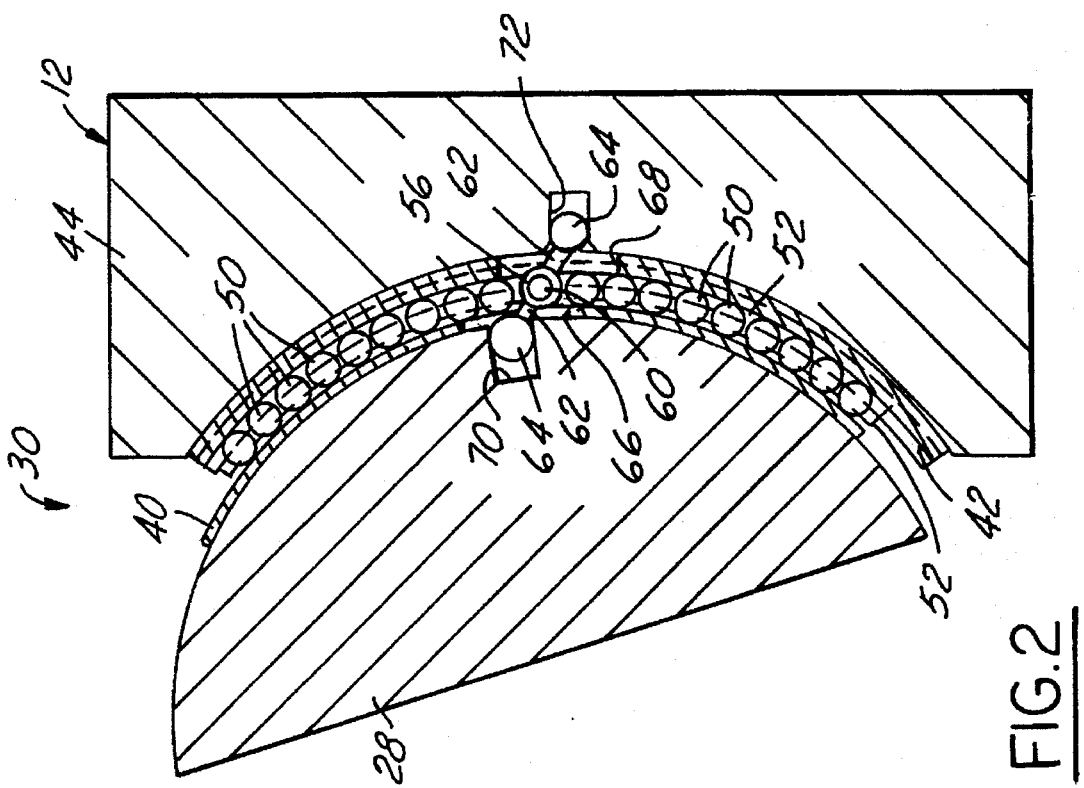
FIG. 2 is a sectional view that illustrates a saddle bearing mounting the displacement control yoke to the housing in the machine of FIG. 1.

Saddle bearing 30 in accordance with one presently preferred embodiment of the invention is illustrated in FIGS. 2 and 3 as comprising an arcuate inner bearing race 40 and an arcuate outer bearing race 42 respectively mounted (by screws or pins not shown) to yoke 28 and base 44 on housing 12. Outer bearing race 42 has a central arcuate slot 46 and a pair of axially spaced radially extending end ribs 48. A plurality of rollers 50 are rotatably captured in corresponding pockets of an arcuate cage 52, which is slidably disposed in bearing channel 46 such that rollers 50 are axially captured between ribs 48. In accordance with the present invention, a timing lever 54 has a central portion 56 with an aperture 58 pivotally mounted to a leg 60 that projects laterally from cage 52 between spaced rollers 50. A pair of arms 62 integrally and oppositely extend from central lever portion 56, and terminate in respective part-spherical lever end portions 64. Each arm 62 extends through a corresponding slot 66, 68 in bearing races 40, 42 so that the respective end portions 64 are slidably disposed in cylindrical openings 70, 72 in saddle 28 and housing base 44 respectively. Thus, timing lever 54 functions to locate the bearing elements with respect to each other and with respect to the opposed mounting structure 28, 44, and to limit bearing motion during assembly and operation of the pump. The length of lever 54 is determined by the physical size of the bearing. The lever will position the bearing correctly during assembly and maintain proper position during use. In the particular embodiment illustrated, saddle 28 can rotate approximately 10° in either direction, resulting in rotation at cage 52 of approximately 5° in either direction.

Figure 4:
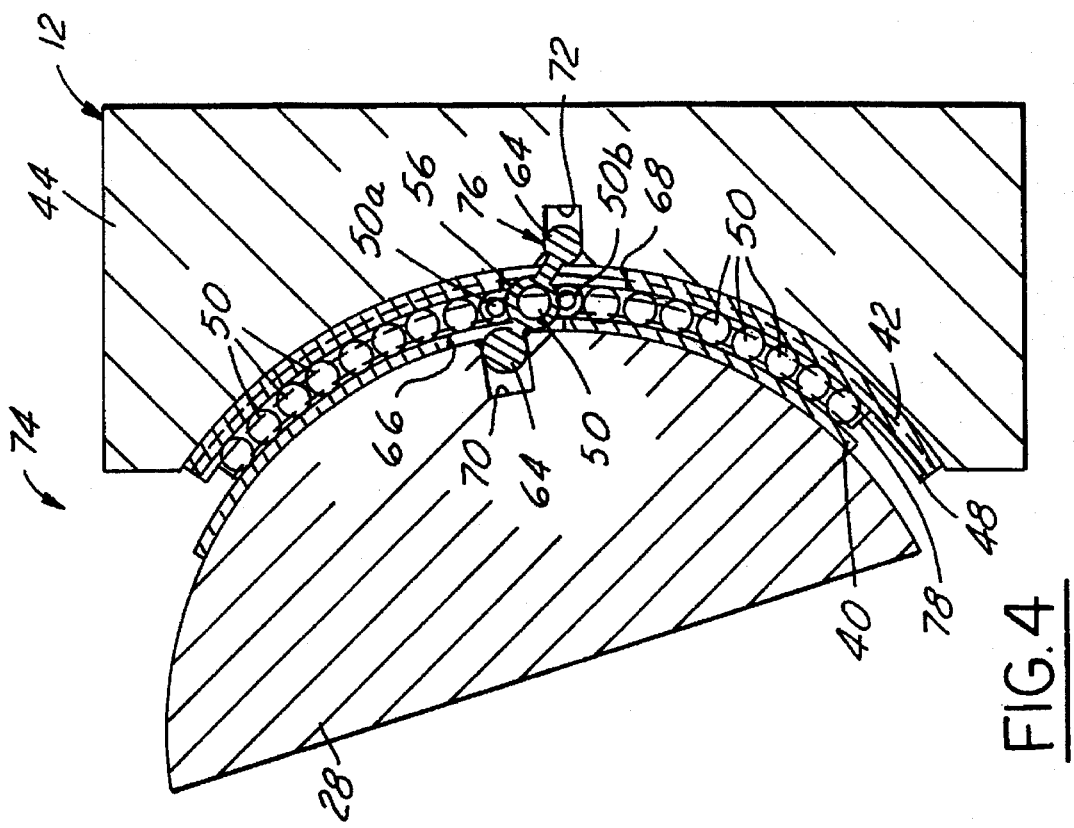
FIG. 4 is a sectional view similar to that of FIG. 2 but showing an alternative embodiment of the invention.
Figure 5:
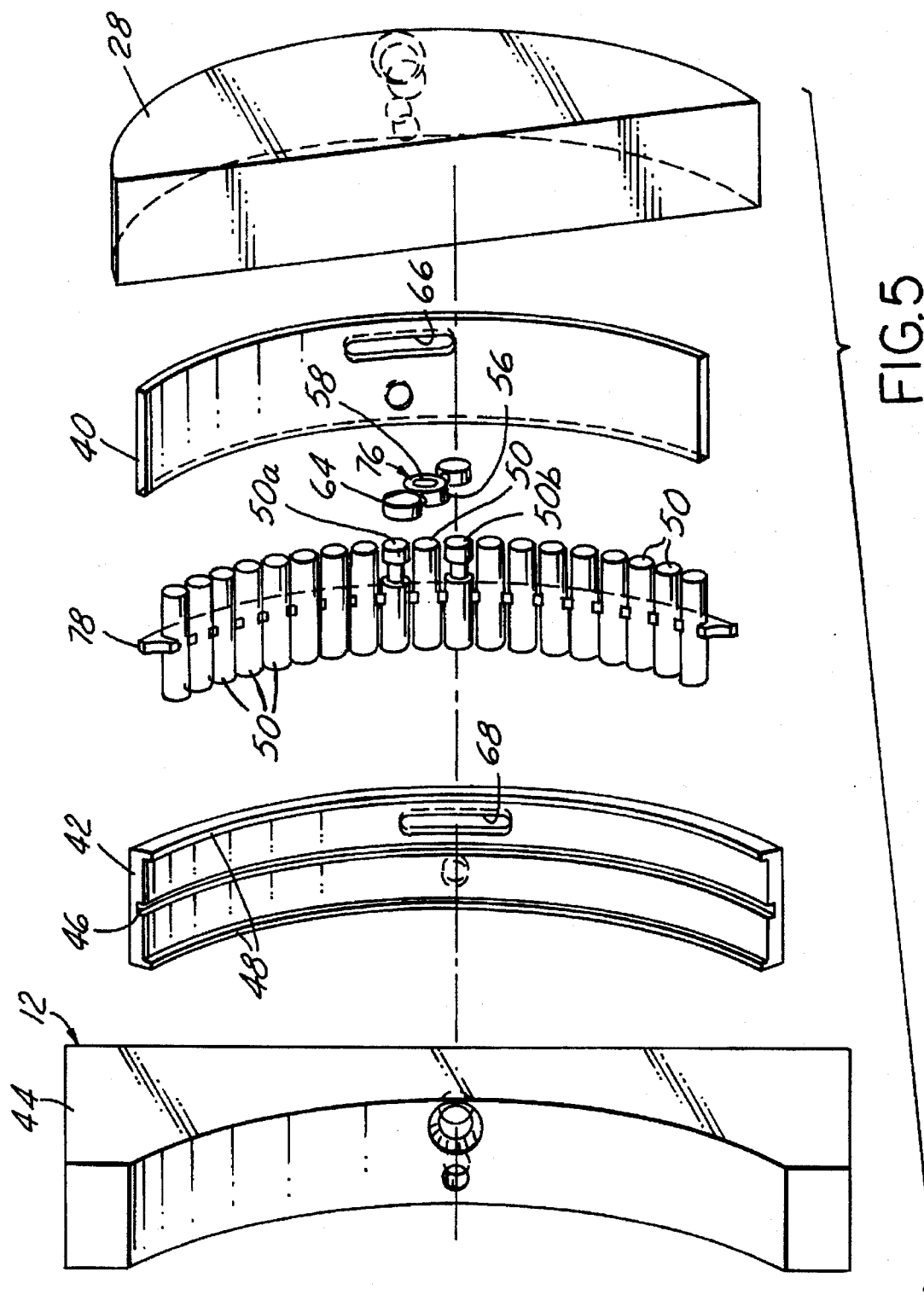
FIG. 5 is an exploded perspective view of the saddle bearing embodiment illustrated in FIG. 4.

FIGS. 4 and 5 illustrate a modified saddle bearing arrangement 74, in which reference numerals identical to those employed in FIGS. 2–3 indicate identical parts or elements. The primary difference between bearing 74 in FIGS. 4 and 5 and bearing 30 in FIGS: 2 and 3 lies in the fact that timing lever 76 in FIG. 4 and 5 is pivotally mounted to one of the bearing miters 50, rather than to an arm on bearing retainer 78. Rollers 50a, 50b on the opposed lateral sides of timing lever 76 have portions of reduced diameter for accommodating central portion 56 of lever 76. Thus, bearing 74 in FIGS. 4 and 5 has the advantage of capturing lever 76 between the roller bearing elements, but the disadvantage of requiring special machining of two bearing elements 50a, 50b.

Figure 6:
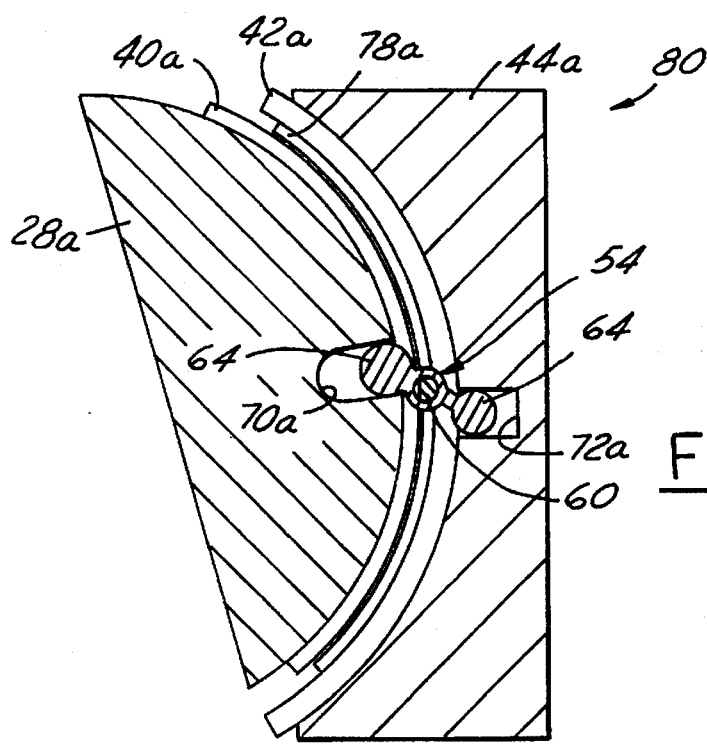
FIG. 6 is a sectional view similar to those of FIGS. 2 and 4 but showing another alternative embodiment of the invention.
Figure 7:
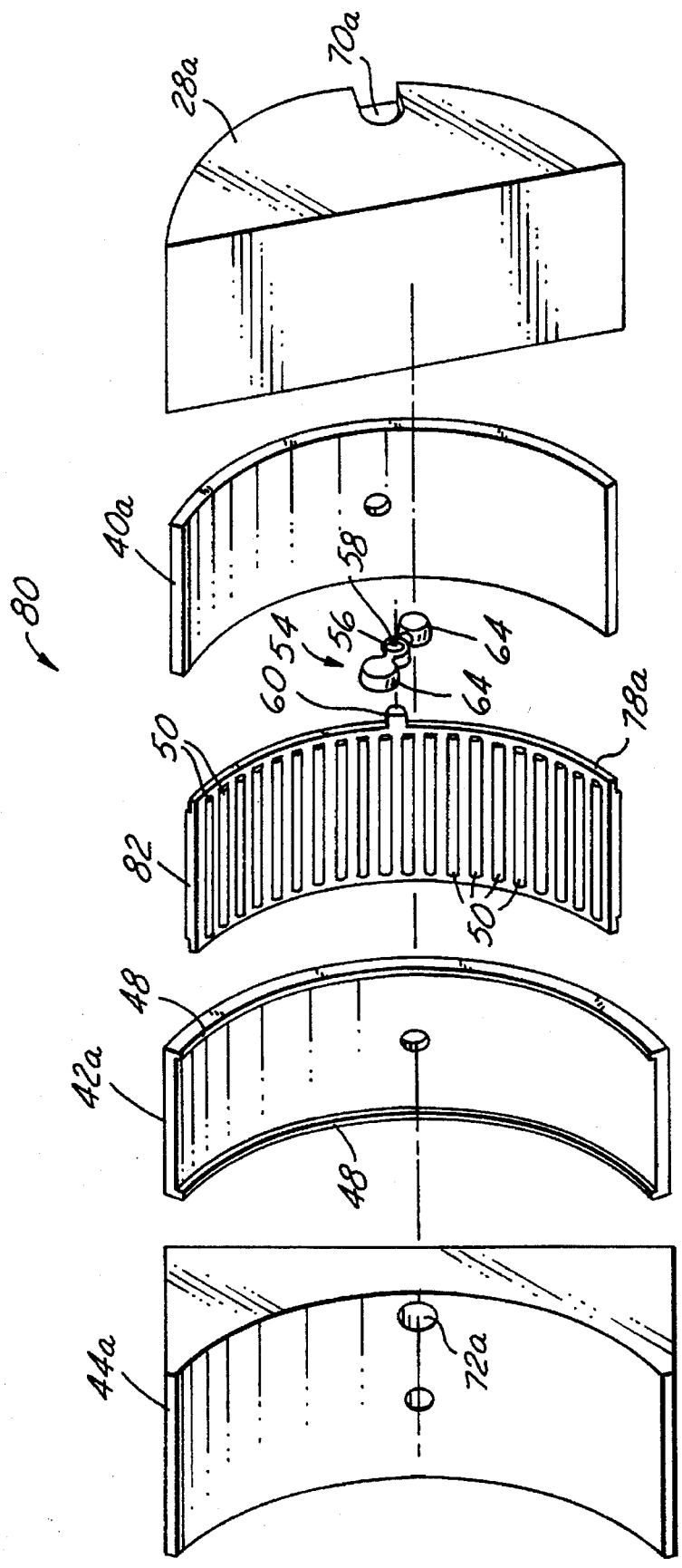
FIG. 7 is an exploded perspective view of the saddle bearing embodiment illustrated in FIG. 6.

FIGS. 6 and 7 illustrate another saddle bearing arrangement 80, in which reference numerals identical to those employed in FIGS. 1–5 indicate identical parts, and reference numerals followed by a suffix indicate similar parts. In bearing 80, rollers 50 are disposed in a cage 78a that longitudinally captures the rollers. Cage 78a has a leg 60 extending laterally from one side edge thereof, and timing lever 54 is pivotably mounted on leg 60. This lever 54 in bearing 80 is laterally offset from the arcuate centerline of cage 78a and disposed on one lateral edge of the cage. Lever 54 is also disposed laterally outwardly of the side edges of races 40a, 42a. The end portions 64 of lever 54 extend into openings 70a, 72a in saddle 28a and base 44a respectively. Cage 78a has a step 82 that is axially captured between ribs 48 of race 42a.

The invention claimed is:

1. A variable displacement hydraulic piston machine that includes a shaft mounted for rotation within a housing, a plurality of pistons in a cylinder block coupled to said shaft, a yoke engaged by said pistons for controlling displacement of said pistons in said cylinder block, and saddle bearing means pivotally mounting said yoke to a base within said housing, characterized in that said saddle bearing means comprises:

arcuate inner and outer bearing races engaged with said yoke and said housing base respectively, a plurality of rolling elements captured by a cage between said races, and timing means positioning and retaining said races and said cage with respect to each other comprising interengaging means having a central portion carried by and pivotally mounted on said bearing means to pivot about an axis that is fixed on said bearing means and opposed end portions slidably received in said housing base and said yoke.

2. The machine set forth in claim 1 wherein said inner and outer races each includes an arcuate slot through which an associated end portion of said interengaging means.

3. The machine set forth in claim 1 in which said housing base and said yoke have respective openings into which respective end portions of said interengaging means are slidably received.

4. The machine set forth in claim 3 wherein each said end portion of said interengaging means comprises part-spherical bearing means slidably received in the associated opening.

5. The machine set forth in claim 1 wherein said central portion of said interengaging means is pivotally mounted to said cage.

6. The machine set forth in claim 1 wherein said central portion of said interengaging means is pivotally mounted on one of said rolling elements.

7. The machine set forth in claim 6 wherein said rolling elements comprise cylindrical rollers.

8. The machine set forth in claim 1 wherein said saddle bearing means comprises a pair of saddle bearings on laterally opposed sides of said shaft.

9. A saddle bearing that comprises:

arcuate inner and outer bearing races, a plurality of rolling elements, a cage capturing said elements between said races in rolling engagement with said races, and interengaging means having a central portion pivotally mounted between said races to pivot about an axis that is fixed on said bearing, and opposed end portions extending from said central portion through said races for sliding receipt in structure between which said saddle bearing is mounted to position and retain said races and said cage with respect to such structure.

10. The bearing set forth in claim 9 wherein said inner and outer races each includes an arcuate slot through which an associated end portion of said interengaging means projects.

11. The bearing set forth in claim 9 wherein each said end portion of said interengaging means comprises part-spherical bearing means.

12. The bearing set forth in claim 9 wherein said central portion of said interengaging means is pivotally mounted to said cage.

13. The bearing set forth in claim 9 wherein said central portion of said interengaging means is pivotally mounted on one of said rolling elements.

14. The bearing set forth in claim 13 wherein said rolling elements comprise cylindrical rollers.

* * * * *